Figure 1:
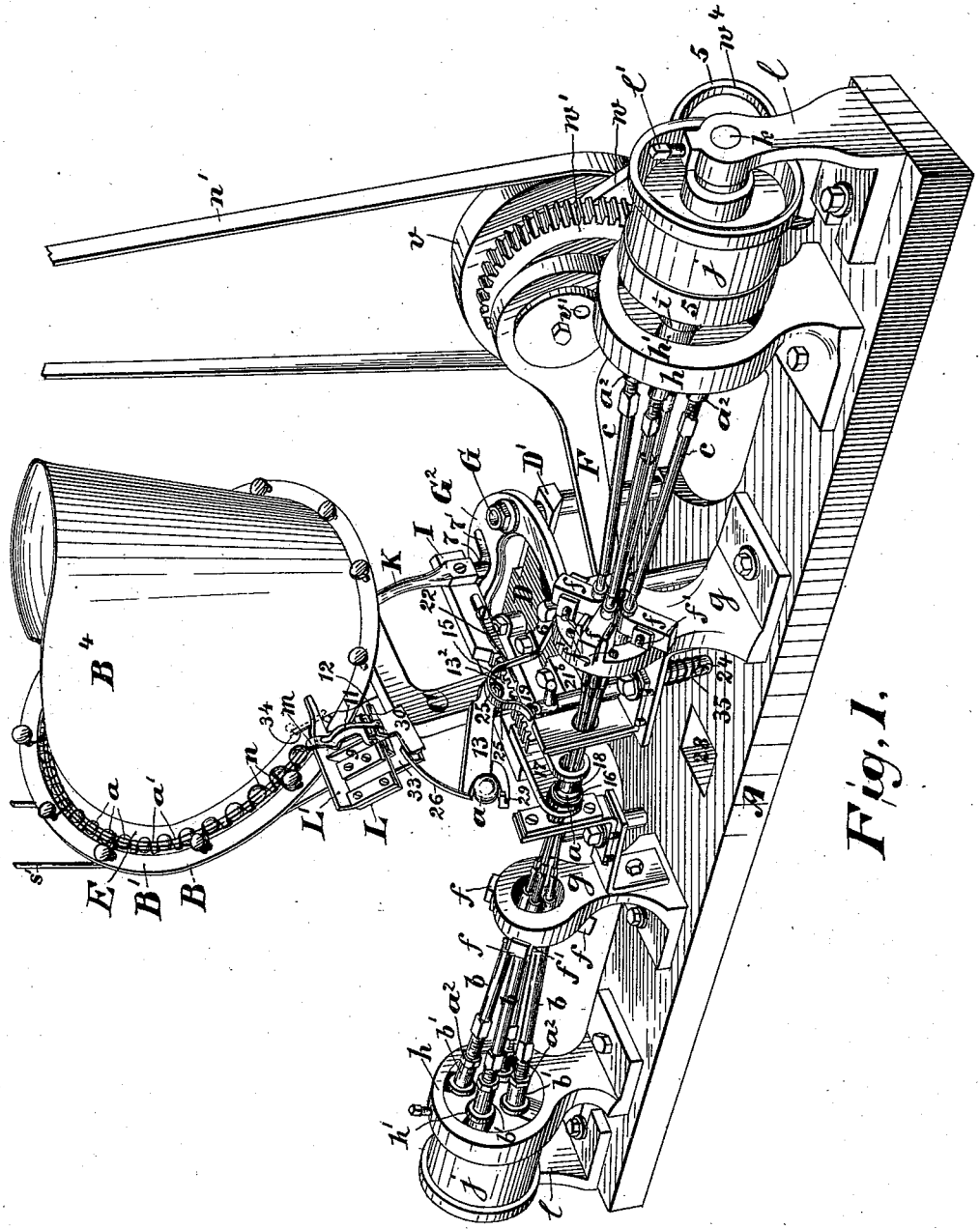

(No Model.)  T. F. MORRISSEY.  9 Sheets—Sheet 1.
BUTTON MAKING MACHINE.

No. 547,561.  Patented Oct. 8, 1895.

WITNESSES:  INVENTOR:
Robert Sollberger  Thomas F. Morrissey;
Louisa Browne.
BY Drake & Co. ATTY'S.

(No Model.)

T. F. MORRISSEY.
BUTTON MAKING MACHINE.

No. 547,561. Patented Oct. 8, 1895.

9 Sheets—Sheet 2.

Witnesses
Robert Spellberger
Louisa Browne.

Inventor:
Thomas F. Morrissey;
By Draket Co Atty's.

(No Model.) 9 Sheets—Sheet 3.
T. F. MORRISSEY.
BUTTON MAKING MACHINE.
No. 547,561. Patented Oct. 8, 1895.
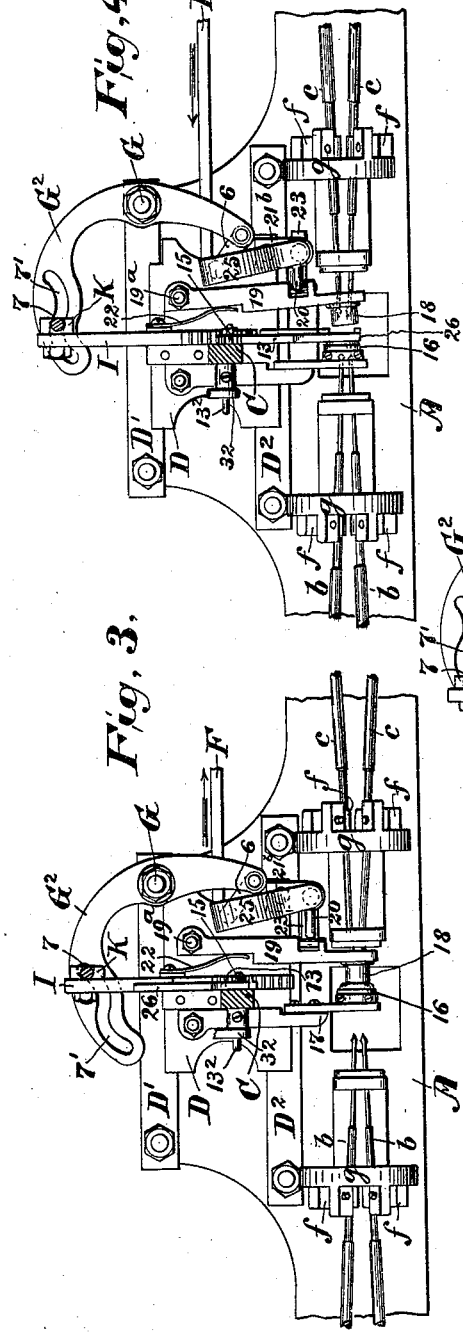
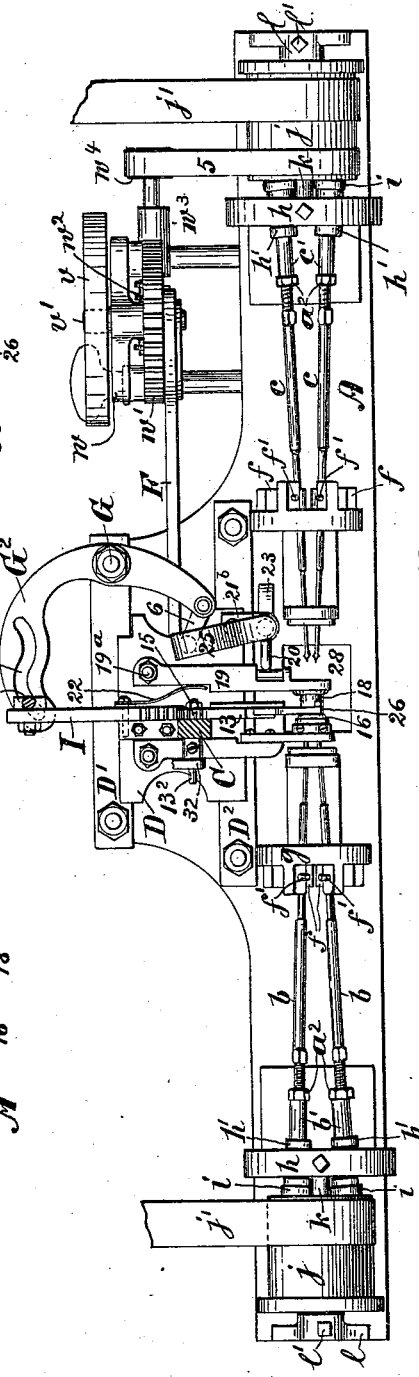
Witnesses
Robert Sollberger
Louise Browne
Inventor:
Thomas F. Morrissey;
By Drake & Co., Atty's.

(No Model.)
T. F. MORRISSEY.
BUTTON MAKING MACHINE.
No. 547,561.
9 Sheets—Sheet 4.
Patented Oct. 8, 1895.
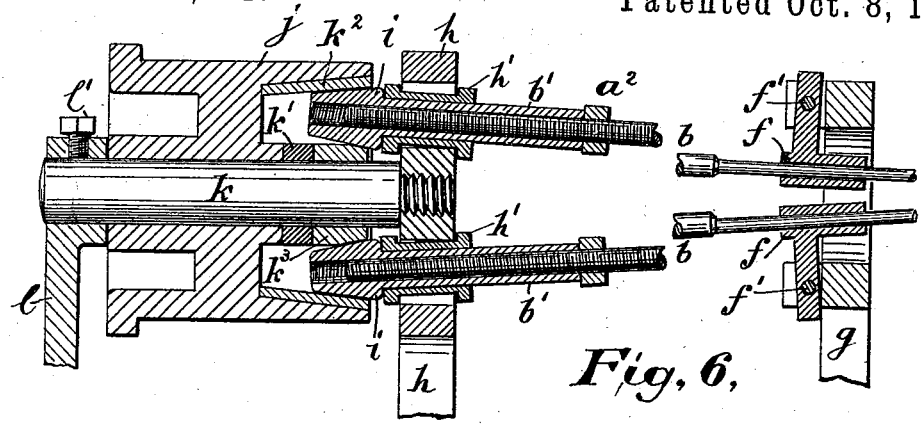
Fig. 6.
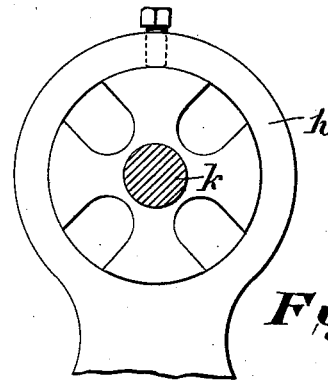
Fig. 7.
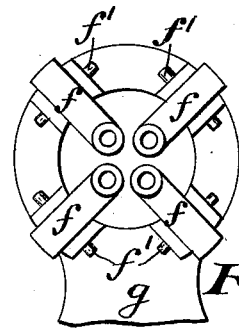
Fig. 8.
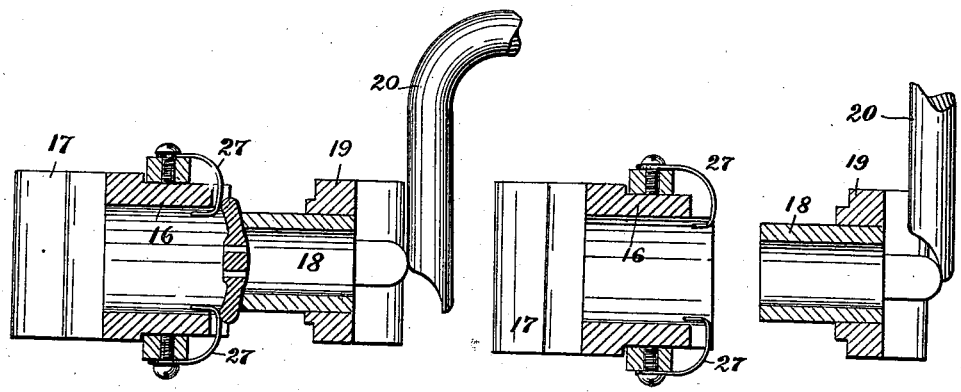
Fig. 9.
Fig. 10.
Witnesses
Robert Sollberger
Louisa Browne
Inventor:
Thomas F. Morrissey,
By Drake & Co Atty's (No Model.)  9 Sheets—Sheet 5.
T. F. MORRISSEY.
BUTTON MAKING MACHINE.
No. 547,561. Patented Oct. 8, 1895.
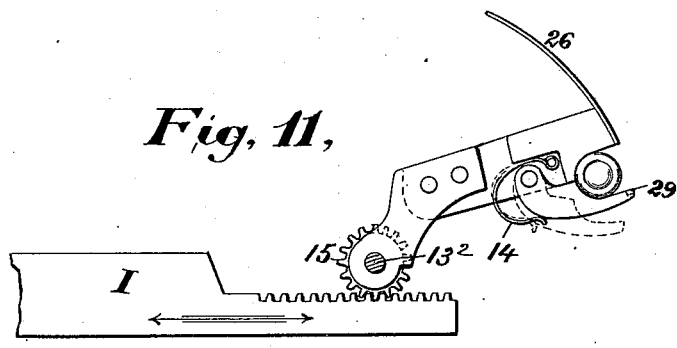
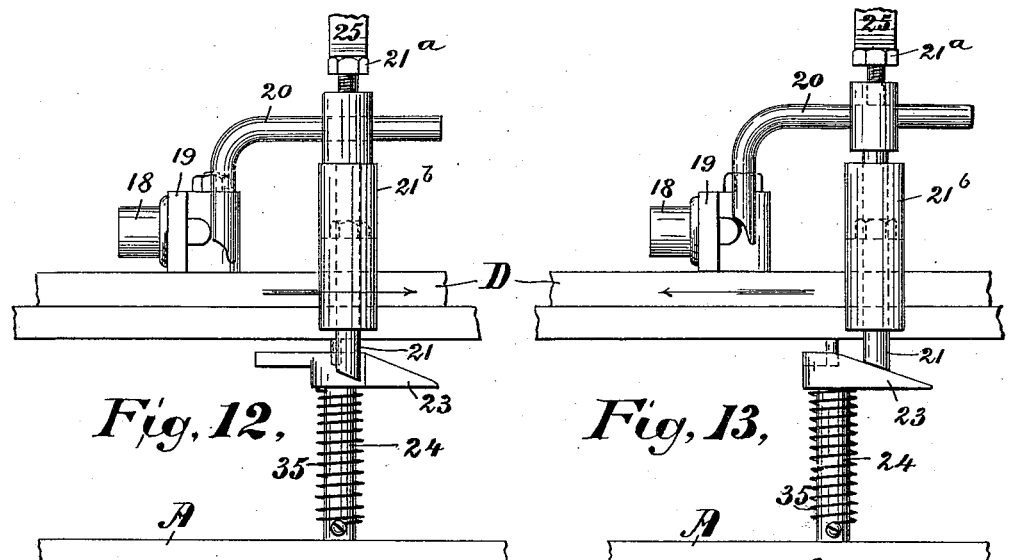
WITNESSES: INVENTOR
Robert Soelberger Thomas F. Morrissey;
Louisa Browne. BY Drake & Co. ATTY'S.

(No Model.)

9 Sheets—Sheet 6.

T. F. MORRISSEY.
BUTTON MAKING MACHINE.

No. 547,561.

Patented Oct. 8, 1895.

WITNESSES:
Robert Sollberger
Louisa Browne

INVENTOR:
Thomas F. Morrissey,
BY Drake & Co. ATTY'S.

(No Model.) 9 Sheets—Sheet 7.
T. F. MORRISSEY.
BUTTON MAKING MACHINE.
No. 547,561. Patented Oct. 8, 1895.
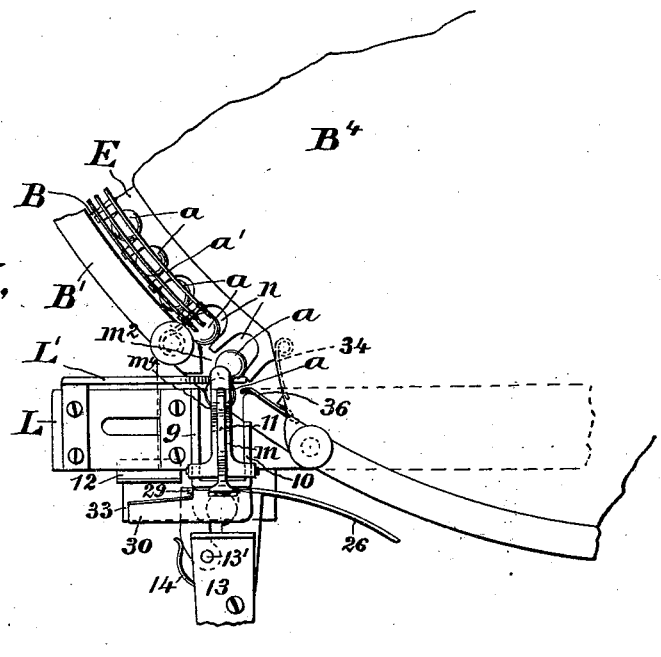
Fig. 17.
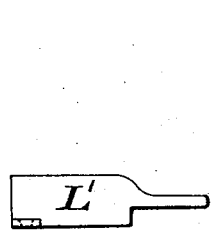
Fig. 19,
Fig. 20,
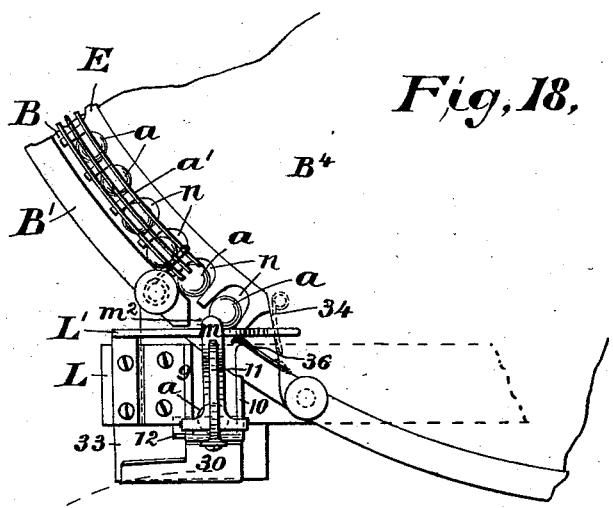
Fig. 18,
WITNESSES:
Robert Solburger
Louisa Browne.
INVENTOR:
Thomas F. Morrissey:
BY Drake&Co ATTY'S.

(No Model.)  9 Sheets—Sheet 8.

T. F. MORRISSEY.
BUTTON MAKING MACHINE.

No. 547,561.  Patented Oct. 8, 1895.

Witnesses  Inventor
Robert Sollberger  Thomas F. Morrissey;
Louisa Browne.  By Drake & Co. Atty's.

(No Model.) 9 Sheets—Sheet 9.

T. F. MORRISSEY.
BUTTON MAKING MACHINE.

No. 547,561. Patented Oct. 8, 1895.

WITNESSES: Robert Loellberger, Louisa Browne.

INVENTOR: Thomas F. Morrissey;
BY Drake & Co. ATTY'S.

UNITED STATES PATENT OFFICE.

THOMAS F. MORRISSEY, OF NEWARK, NEW JERSEY.

BUTTON-MAKING MACHINE.

SPECIFICATION forming part of Letters Patent No. 547,561, dated October 8, 1895.

Application filed April 27, 1894. Serial No. 509,237. (No model.)

*To all whom it may concern:*

Be it known that I, THOMAS F. MORRISSEY, a citizen of the United States, residing at Newark, in the county of Essex and State of New Jersey, have invented certain new and useful Improvements in Button-Making Machines; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

The object of this invention is to overcome certain difficulties which have been experienced in connection with button making and finishing machines, and to secure certain advantages and results in the construction and operation of the present improvement over those heretofore employed in such machines.

The invention consists in the improvements and in the arrangement and combinations of the various parts thereof, as herein set forth, and finally pointed out in the several clauses of the claim.

Figure 2:
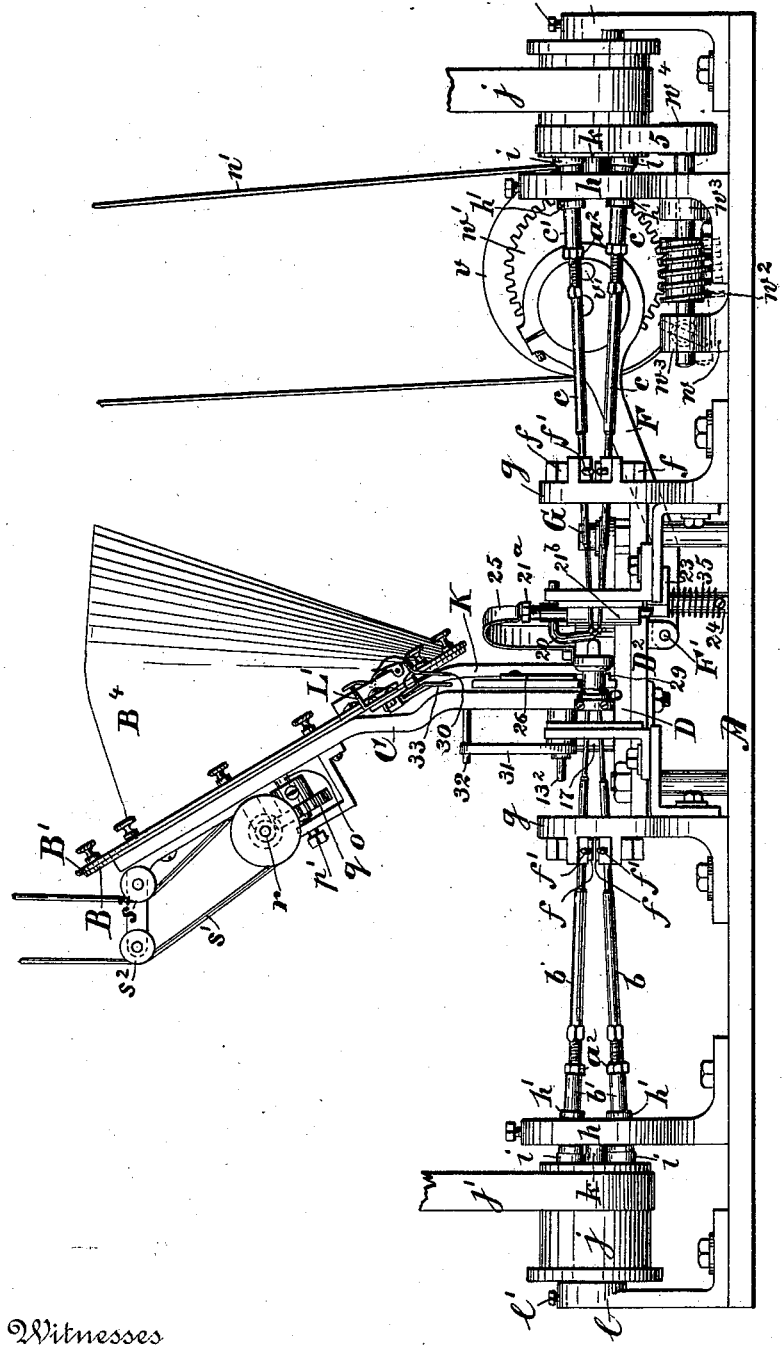
Figure 21:
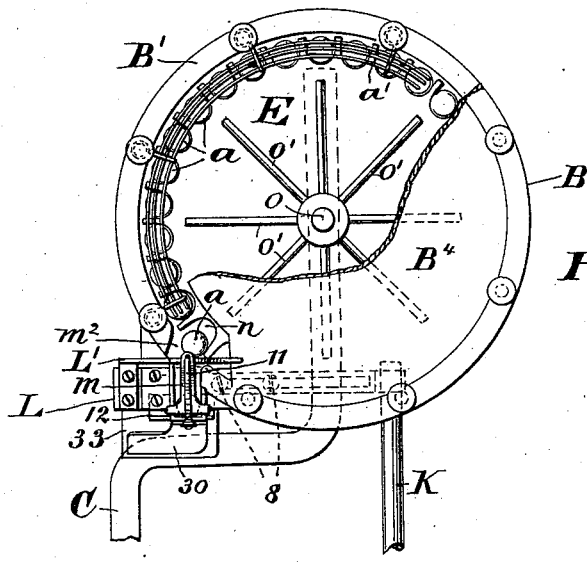
Figure 22:
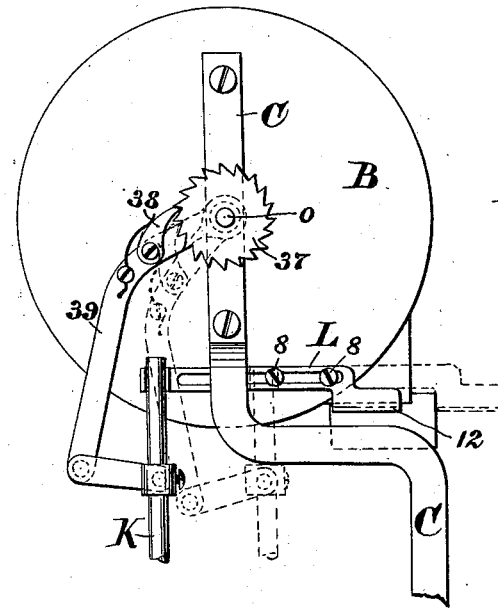
Figure 23:
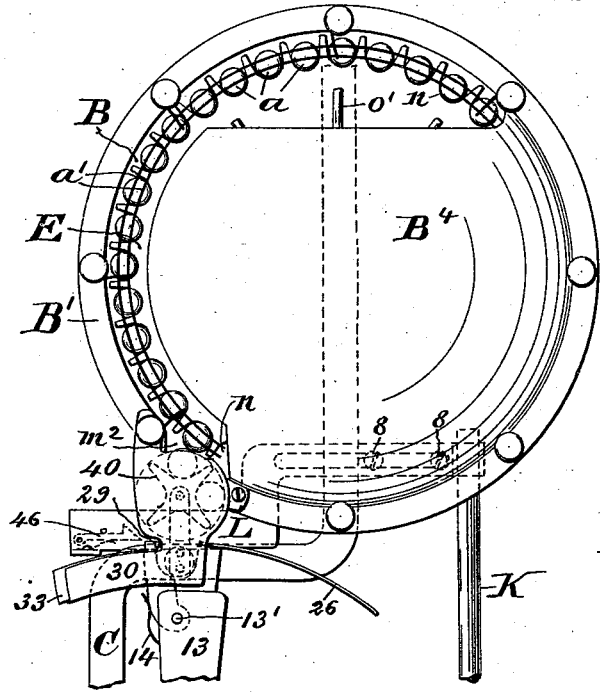
Figure 24:
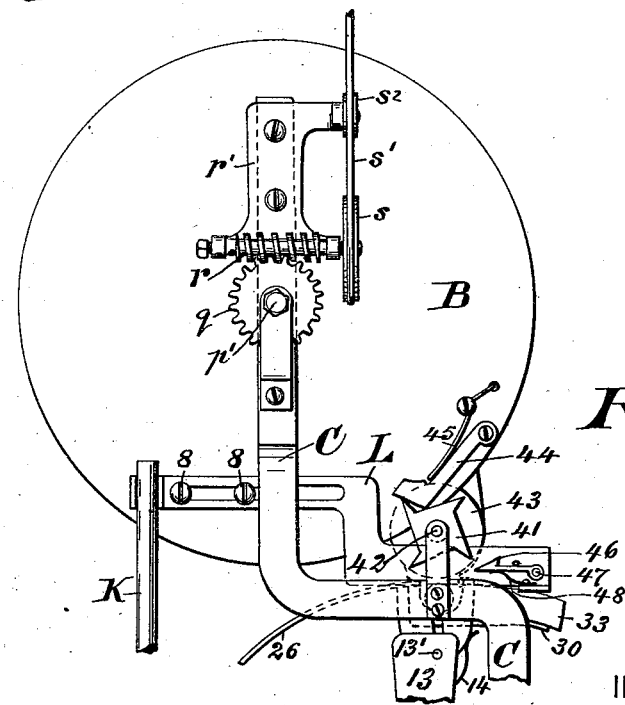

Referring to the accompanying drawings, in which similar letters and numerals of reference indicate corresponding parts in each of the several views where they occur, Figure 1 represents in perspective a button drilling and countersinking machine embodying my improvements. Fig. 2 represents the same in side or front elevation. Fig. 3 is a top plan view with the ends broken off, but showing the parts in position to receive a button from the hopper or receiver and after a button has been drilled and is countersunk. Fig. 4 represents a similar view showing the position of the working parts when the button is delivered to the chuck to be drilled. Fig. 5 is a full top plan view of the same and showing the positions of the working parts when the machine is in position to drill a button on one side. Figs. 6, 7, 8, 9, 10, 11, 12, 13, 14, 15, 16, 17, 18, 19, and 20 represent in section and elevation, respectively, certain details which will be further referred to hereinafter. Fig. 21 is a detail in front elevation of the hopper or feeder with the casing broken away and showing a rotatable plate, &c., and a modification of a portion of the feed mechanism, which will be further referred to in the body of the specification. Fig. 22 represents a back view of the same, showing said modification and other of the working parts. Figs. 23 and 24 are a front and back view, respectively, of the hopper and its co-operating parts and showing other modified forms of portions of the feeding mechanism.

In said drawings, A designates the bed-plate, upon which the working parts are mounted, and $b$ and $c$ designate, respectively, the two groups of drill-carrying spindles. These parts are in themselves old. The drill ends of said spindles are mounted in rocking or adjustable bearings $f$, which are pivotally mounted at $f'$ to the heads $g$, Figs. 1 and 6, and at their outer extremities are loosely mounted in the heads $h$ in suitable bearings $h'$. These features of construction render the drills adjustable—that is to say, by moving the head $g$ longitudinally of the spindles inward toward the heads $h$ the points of the drills will be drawn closer together, and by moving it in the opposite direction they will be spread farther apart, thereby admitting of the drilling of buttons of varying sizes, as will be understood. On the outer ends of said spindles are tapering fast pulleys $i$, Figs. 1, 2, 5, and 6, which are housed in pulleys $j$, which engage in frictional contact with said pulleys, the said pulley $j$ being mounted upon a stationary stud or bearing $k$, supported by the head $h$, in which it is screwed at one end and a bracket $l$ at the other, in which it is fastened by a set-screw $l'$. Upon said bearing $k$ is also mounted a washer $k'$ and a ring $k^3$, Fig. 6, the outer extremity of which is tapered and engages in frictional contact with said pulleys $i$, the washer being intended to make the necessary adjustment. This construction contributes to the adjustability of the spindles in their relation to one another at their ends and against the inner surface of the pulley $j$, as will be understood upon reference to Fig. 6. It also insures a sure and steady motion to the spindles and avoids the jerking motion resulting from the use of gears. It may be observed that the bearings $h'$ are loosely mounted in the head $h$, as already stated, to provide for the adjustability of said spindles, and are flattened on two opposite sides to prevent them from turning. It will be seen from the foregoing that as the pulley $j$ is driven by a suitable belt $j'$, Figs. 2 and 5, the four spindles of each group are thereby rotated simultaneously. It may be further added that the pulleys $i$ and the surfaces $k^2$ against which they bear should be of yielding or flexible material, preferably to more readily permit or facilitate the adjustability referred to and to increase the adhesion of the parts. Provision is also made for lengthening or shortening said spindles, for which purpose they are made in two parts $b$ and $b'$ and $c$ and $c'$, the spindles being threaded a portion of their length and screwing into the parts $b'$ and $c'$, which are also threaded interiorly a part of their length for the purpose, as will be understood upon reference to the said Fig. 6, and when adjusted are held in position by a jam-nut $a^2$.

B designates a flat stationary disk or plate supported upon an inclined bracket C, Figs. 1, 2, 16, 17, 18, 21, and 22, secured to a longitudinally-reciprocating carriage D, as shown in Figs. 1, 2, 3, 4, 5, 12, and 13. At the outer edge of said disk or plate is a raised rim $B'$, Figs. 1, 2, 16, 17, 18, and 21, leaving the surface of said disk inside the said rim sunken, said rim having an opening or passage-way $m^2$ formed therein, Figs. 17, 18, and 21, the purpose of which will be hereinafter stated. Arranged within the recess or depression formed by said rim is a flat disk E, Figs. 1, 17, 18, and 21, mounted upon a shaft $o$ at the center of said disk B and adapted to rotate thereon. Around and in the peripheral portion of said disk E are formed a series of notches or receptacles $n$, each being adapted to receive and carry a button and to deliver the same as said disk rotates at the opening or passage-way $m^2$ automatically and uniformly faced, for the purposes hereinafter stated. Said disk E is also provided with radial ribs $o'$, Fig. 21, which serve to agitate the buttons and to facilitate their delivery or ingress into the receptacles $n$. Secured to said disk B or the rim $B'$, thereof is a half funnel-shaped plate or casing $B^4$, of sheet metal, Figs. 1, 2, 16, 17, 18, and 21, which, in connection with said disk, forms a hopper or receiver for the buttons that are to be bored and countersunk, which buttons are fed automatically to the boring mechanism or drills, as above intimated. The shaft $o$ passes entirely through the disk B and bracket C, its opposite end being journaled upon the conical end of a screw $p'$, Figs. 2 and 16. Rigidly mounted upon said shaft, near the back end thereof, is a worm-gear $q$, which engages with a worm-shaft $r$, mounted in brackets $r'$, carried by said bracket C. Said shaft is driven by a pulley $s$, mounted thereon, and belt $s'$, connecting therewith and passing over idlers $s^2$ and a pulley $t$, mounted on a counter-shaft $t'$. Said counter-shaft $t'$ also carries a smaller pulley $u$, secured upon the side or forming a part of the pulley $t$, Fig. 16, and is driven by a belt $n'$, Figs. 1 and 2, which connects with a pulley $v$, rigidly mounted upon one end of a shaft $v'$, Figs. 2 and 5, revolving in a bracket $w$, attached to the bed of the machine. Upon the opposite end of said shaft $v'$ is mounted a worm-gear $w'$, which meshes with a worm $w^2$, mounted in suitable bearings $w^3$, projecting from the bracket $w$, Figs. 1, 2, and 5. On the end of said worm-shaft is mounted a driving-pulley $w^4$, which connects by belt 5 with the main driving-pulley $j$, Figs. 1, 2, and 5.

F designates a connecting-rod, Figs. 1, 2, 3, 4, and 5, one end of which is eccentrically mounted upon the worm-gear $w'$, Figs. 1, 2, and 5, and the other connecting at $F'$, Fig. 2, with the reciprocating carriage D, mounted upon ways $D'$ $D^2$, Figs. 1, 2, 3, 4, 5, 12, and 13. Upon said reciprocating carriage is mounted the mechanism for receiving and delivering the buttons from the hopper or receiver to the drills, which mechanism is as follows: Upon one of said ways is pivotally mounted at G a cam-lever $G^2$, Figs. 1, 2, 3, 4, and 5, one end of said cam-lever being pivotally connected with said reciprocating carriage by a link 6, Figs. 1, 3, 4, and 5, and at the other end with a rack-bar I by a trundle 7, connected therewith, and which works in a cam-slot $7'$, formed in the said end of the cam-lever. From said rack-bar projects upwardly an arm K, Figs. 1, 2, 3, 4, 5, 21, and 22, upon the lower end of which the said trundle is mounted and which is connected with said bar I and engages with a slide-plate L, mounted upon the back of the disk B by means of screws 8 or other suitable means to allow of a reciprocating motion. On the outer end of said sliding plate is mounted a cam-bar $L'$, Figs. 1, 2, 16, 17, 18, and 20, which engages with one end of a hinged cut-off $m$, the opposite end being pivoted or hinged to guides 9 and 10, and is actuated in one direction by means of a spring 11. Between said guides is a passage-way for the buttons, and at the bottom edge of said sliding plate is arranged a cut-off 12 to catch the buttons as they drop between the guides from the hinged cut-off and deliver them to a grip 13, one of the jaws of which is pivoted to the other at $13'$, so as to open and close, said grip being kept normally closed by a spring 14, and being pivoted at $13^2$ to a portion of the bracket C, and provided with a rack-pinion 15, which engages with and is operated by the rack-bar I, Figs. 1 and 11, which operates to throw the grip downward and opposite to a chuck 16, carried by a movable arm 17, and brings the button properly centered in front of the drills, the button and the grip lying between said chuck and a hollow stud 18, Figs. 1, 2, 3, 5, and 9, carried by an arm 19, pivotally secured to said movable carriage at $19^a$, Figs. 1, 3, 4, and 5, said arm being operated by means of a cam-arm 20, carried by a vertically-movable plunger 21, in which it is held by a set-screw $21^a$ to press the stud 18 against the button and force it into the hollow chuck 16 and holding it there until it is drilled and reamed from one side, as will be understood. This being done, the button is then carried backward by the movable carriage until it comes into engagement with the opposite set of drills, and is held until it is drilled and reamed from the other side. It is then carried forward to the position in which it first received the button. The hollow stud 18 in said arm in the meantime is thrown back by the action of a spring 22, the cam-arm 20 being raised by an inclined tripping-block 23, mounted and working upon a vertical stud 24, to permit of such action, as will be understood upon reference to Figs. 1, 2, 3, 4, 5, 9, 10, 12, 13, 14, and 15. A coil-spring 35 is adjusted around the vertical stud and engages with the said spring-actuated and rotating tripping-block 23 to hold it in position, said vertical plunger 21, which is held in a bracket $21^b$, secured upon the movable carriage D, being forced down again by a spring 25, Figs. 1, 2, 3, 4, 12, and 13, as the movable carriage is being operated. The upper jaw of said grip carries a rearwardly-curved extension 26, Figs. 1 and 11, on which the button first falls after the passage-way $m^2$ is opened, (by the cut-off 12,) and on which it rests as the grip is being lifted and carried backward until it drops into the jaws of said grip, at which point it rests a moment and is then carried forward between the guide-plates 30 and 33 and delivers the button to the chuck, as above stated. These various operations are produced by the action of the movable carriage. It will be understood that when the button has dropped into the grip the movable carriage will be thrown forward by the action of the eccentric connecting-rod, whereby the cam-lever is operated to throw the rack-bar rearward, which, acting upon the pinion 15, forces the grip forward and downward, Fig. 11, until the button is delivered to the chuck, as before stated. While these movements are taking place the said sliding plate L, carrying the cam-bar L' and the cut-off 12 at the bottom, moves in conjunction with the rack-bar I, to which it is attached by the arm K, thereby producing an alternate action or movement in the said cut-off 12 and the cut-off or clamp $m$, the latter being hinged at one end over the passage-way to guides 9 and 10, the portion $m^4$ thereof reaching down into the passage-way for the purpose of catching a button as it falls from the rotating receptacles $n$ at $m^2$. In the first or backward of said movements the cam-bar lifts the hinged clamp or cut-off $m$ and allows the button at $m^4$ to drop upon the cut-off 12, which has reached the point in the passage-way to receive it, and at the same time L' closes the passage at the top and prevents another button from dropping prematurely. On the return or forward movement the cut-off 12 is carried back and opening the passage allows the button to drop on the rearward extension 26 of the grip 13, which in its movement carries and delivers it to the chuck 16, as will be understood upon reference more particularly to Fig. 1 in connection with Figs. 17 and 18, the latter two figures being enlarged and showing the parts more plainly. While the latter described movement is taking place, the vertical plunger, carrying the cam-arm 20, is being raised, and at the proper moment releases the plunger, allowing it to move backward, and permitting the grip to pass between the chuck and the hollow stud and deliver another button to said chuck. Upon the return movement, as said plunger is moved backward, spring-fingers 27, working in the hollow chuck, operate to throw the button out of said chuck, allowing it to drop into a receptacle 28 beneath, arranged to receive it. It may be observed at this point that a guard-rail $a'$ is placed around the edge of and above the receptacles $n$ in the revolving disk E to prevent the buttons from getting out of place. In the present case three wires have been arranged, but one will be sufficient, placed over the central portion of the recesses. It may be observed that the pivoted lower jaw of said grip is provided with a lug 29 at its outward extremity, which as the grip is raised and thrown backward abuts against a portion of the guide-plate 30, which serves to open the grip for the reception of a button therein. As the grip is thrown forward it is closed by the action of the spring 14, Figs. 11 and 17, heretofore referred to, and grips the button. It will be also observed that to one end of the shaft $13^2$, carrying the rack-pinion 15, is secured one end of a coil-spring 31, Fig. 2, the other end being secured to a suitable stud 32 on the bracket C, the function of the spring being to take up lost motion, if there be any between the rack-pinion and the rack-bar, as will be understood. It will be further observed that the grip as it moves upward and backward to receive a button passes between guide-plates 30 and 33, Figs. 1, 2, 3, 4, 5, 11, and 17, the purposes of said guide-plates being to insure the delivery of the button in its vertical and proper position in the grip, preventing it from tilting or dropping out or from being otherwise improperly delivered, said guide-plates being a little closer together at the outer extremities, so that as the button and the claw pass between them, if the button be not in perfect alignment with the grip, it will be forced to its proper position by the pressure of the guide-plates, as they have a spring action.

The hopper is provided with a spring-gate 34 at or near the point where the buttons are delivered by the rotating disk E, Figs. 1, 17, and 18, which permits a button which may fail of delivery to be carried into the hopper again and prevents the button from choking up or interfering with the continuous and proper delivery of the buttons. The wire being yielding, not only permits the buttons to be carried inside the hopper, as stated, if they pass the point of delivery, but also prevents the buttons in the hopper from escaping therefrom.

In order to aid in preventing a button from lodging in and choking the mouth of the passage-way, I have arranged a spring-lip 36 at the lower side of said mouth, Figs. 17 and 18, to catch the button and facilitate its passage into the hopper. The buttons, which are convex upon one side, usually the back, are caused to be delivered by the rotating disk uniformly faced by means of the radial ribs thereon, and by reason of the fact that the agitation of said buttons in the hopper produced thereby and by the rotation of said disk, results in the overturning of such of the buttons as may happen to lie upon their backs or convex sides. This result will be evident from the fact that when upon their convex sides the buttons lie unsteadily and rock from side to side as the disk rotates until they finally get turned over, when, of course they will lie steadily. This operation is also facilitated by the inclined position of the rotating disk, and even should a button get into one of the receptacles n while lying upon its convex side, the disk, being thinner than the button, as it must be, the latter would inevitably slide out again and eventually be turned over by its contact with other buttons or by reason of the conditions above stated, so that the buttons will finally be delivered from the hopper uniformly faced, as already stated.

Figure 16:
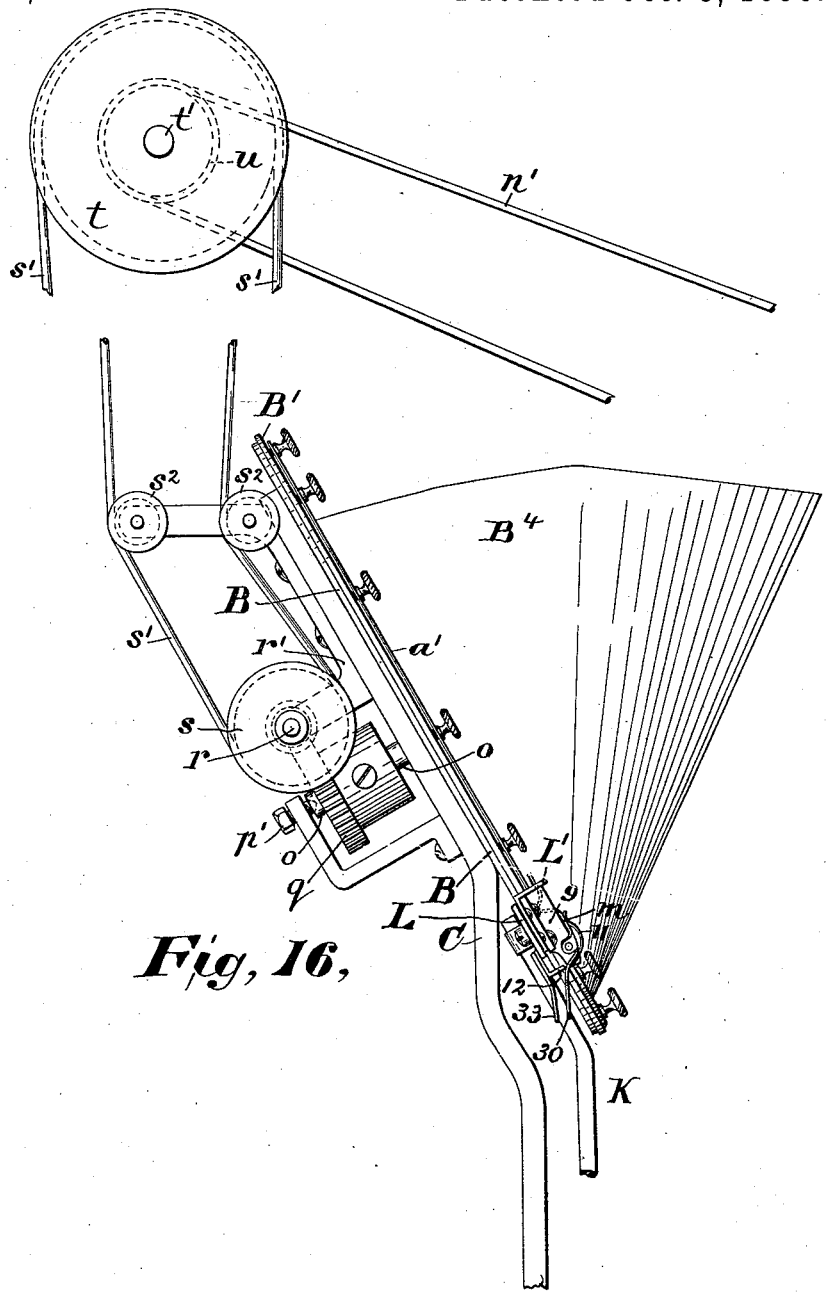

The modification shown in Fig. 22 consists in the substitution of a ratchet 37 and a spring-actuated pawl 38, mounted upon an arm 39, connecting with the arm K and with the shaft o, in place of the worm and gear shown in Figs. 2 and 16, for the purpose of operating the disk E and other parts connected therewith, as will be understood.

In Figs. 23 and 24 a star-wheel 40 is substituted for the cam-bar L', said star-wheel receiving the buttons from the hopper, and as it rotates delivering them to the grip, as will be understood upon reference to Fig. 23. Said star-wheel is mounted upon a shaft 42 and is rotated and held step by step by means of spring-actuated pawls 44 and 46, which engage with a ratchet-wheel 41, which is mounted upon the same shaft with said star-wheel, the operation of which will be readily understood upon reference to Figs. 23 and 24, the star-wheel being mounted between the guide-plates 30 and 33, or the latter may be integral with said star-wheel, one of said pawls and springs being mounted upon the plate B and the other upon the sliding plate L, Fig. 24.

Having thus described my invention, what I claim as new is the combination, in a button-machine, of the following elements, to-wit:

1. The combination of drill-carrying spindles arranged in groups and having bearings at their outer extremities; hinged bearings, f, in which said spindles are mounted, near their inner extremities; heads, g, carrying said bearings and adapted to be moved longitudinally with respect to said spindles, whereby the latter are capable of being adjusted with relation to one another, as described, and for the purposes set forth.

2. The combination of drill-carrying spindles arranged in groups and having at their outer extremities tapering heads or pulleys; a driving pulley adapted to engage internally, in frictional contact with said heads or pulleys and a ring or sleeve mounted upon the shaft of said driving pulley and adapted to engage also in frictional contact with said heads or pulleys, substantially as set forth.

3. The combination of drill-carrying spindles, arranged in groups and having at their outer extremities tapering heads or pulleys, a driving pulley adapted to engage internally, in frictional contact with said heads or pulleys, a ring or sleeve, mounted upon the shaft of said driving pulley adapted to engage also in frictional contact with said heads or pulleys, and a washer, interposed between said ring or sleeve, and said driving pulley, substantially as set forth.

4. The combination with the drilling mechanism of a longitudinally reciprocating carriage, an inclined bracket or support carried thereby; a hopper carried by said bracket; a disk or plate having a raised rim at the outer edge thereof, with an opening or passage way therein, and rigidly secured to said inclined bracket; and a rotatable disk, seated within said raised rim and centrally mounted and adapted to rotate upon a shaft or pintle carried by said bracket and having a series of notches or receptacles in the peripheral portion thereof, each being adapted to carry and deliver a button into said opening or passage way, automatically, as said disk is rotated, substantially as set forth.

5. The combination with the drilling mechanism of a longitudinally reciprocating carriage, an inclined support mounted thereon; a hopper carried by said support; an annular recessed plate also carried by said support and having an opening or passage-way in the raised rim thereof; a rotatable disk, seated in said recessed plate, having notches in the periphery and raised ribs radiating from the center thereof and means for operating said parts, substantially as set forth.

6. The combination with the drills, of a longitudinally reciprocating carriage; means for operating the same; a hopper mounted on said carriage in an inclined position; and means for automatically delivering the buttons from said hopper to the drills, substantially as set forth.

7. The combination with the drills, of a longitudinally reciprocating carriage, a button holder or hopper mounted on said carriage; means for operating said drills and carriage, and means for automatically delivering the buttons separately and uniformly faced from said hopper to said drills, substantially as set forth.

8. The combination with the drills, of a carriage and means for imparting a reciprocating motion thereto; a hopper to hold the buttons mounted on said carriage; means for automatically delivering the buttons from said hopper, separately and uniformly faced to said drills; and means for automatically delivering the buttons, after they have been drilled and counter-sunk to a receptacle for receiving the same, substantially as set forth.

9. The combination with the drills, and a hopper or holder for the buttons, having a reciprocating motion, of a grip adapted to automatically receive the buttons, separately, as they are delivered from said hopper and means whereby the buttons are conveyed to the drills or chuck, substantially as set forth.

10. The combination with the drills, and a hopper for holding the buttons, having a reciprocating motion; of a grip adapted to automatically receive the buttons, separately as they are delivered from said hopper and means whereby the buttons are conveyed to the drills or chuck and means to release them after being drilled and counter-sunk, substantially as set forth.

11. The combination of a reciprocating carriage and means for operating the same and a hopper mounted on said carriage; of a cam-lever $G^2$, mounted upon a stationary pivot and pivotally connected at one end with said carriage; a rack-bar connecting with the other end of said cam-lever and working in a cam-slot formed therein; a grip pivotally connected with the support for said hopper and carrying a pinion which meshes with said rack-bar, and operating as described, whereby said grip is moved into position to receive a button from the hopper and to deliver it to the drills, substantially as set forth.

12. The combination of the cam-lever, an arm K, connected with and operated by said cam-lever; a rack-bar I, and a sliding plate, L, connected with said arm K, a cam-bar, L', and a cut-off, 12, carried by said sliding plate, a hinged cut-off, m, and means for operating said parts, substantially as set forth.

13. The combination with a hopper and rotating disk, located therein, of a hinged cut-off and means for operating the same, and a grip to receive and hold a button as it is delivered from said hopper and said cut-off, substantially as set forth.

14. The combination with a hopper and a rotating disk working therein, of a sliding plate, L, a cam-bar, L', and a cut-off, 12, carried by said sliding plate, hinged cut-off, m, means for operating said parts, as described, and means for receiving a button from said cut-off 12, and delivering it in position to the drills, substantially as set forth.

15. The combination with the drills, and a chuck, 16, of a grip to carry a button to said chuck, and a hollow stud or punch, 18, to force the button from said grip into said chuck, to be drilled, substantially as set forth.

16. The combination, with a hopper stationary with respect to its support and having an inclined and rotatable bottom or side, of a grip having a pivoted jaw, means, 30, to automatically open said jaw to receive a button and means to close it upon said button, substantially as described and for the purposes set forth.

17. The combination in a button making machine, of a hopper having an inclined and rotatable side or bottom; a support therefor; a grip carried by said support, to receive a button from said hopper; a chuck, 16, and its carrying arm 17, a hollow stud or punch, 18, and its carrier, 19; a cam-arm, 20; a plunger 21 by which said cam-arm is carried; a tripping block, 23; and means for operating said parts, substantially as set forth.

18. The combination, in a button making machine, of a hopper having an inclined and rotatable bottom; a support therefor; a grip and a pinion carried by said support; a rack bar in operative connection with said pinion and grip; a cam lever operating said rack bar, and means for operating said cam lever, as described, substantially as and for the purposes set forth.

19. The combination, in a button making machine, having a hopper with an inclined and rotatable side or bottom, and with the operating mechanism thereof; of a grip; a chuck to receive a button therefrom, and a movable arm or carrier, 17, to carry the button in proper position to be operated upon, substantially as set forth.

20. The combination in a button making or finishing machine, of a hopper having an inclined and rotatable side or bottom with radial ribs on the face and button receptacles at the outer rim thereof; and a guard rail, $a'$, to hold the buttons in place, as and for the purposes set forth.

21. The combination with the hopper and the rotating disk, of an opening in said hopper to admit the passage of a button thereat into said hopper that fails of being delivered into the chute, and a spring wire gate, to prevent a button from escaping from said hopper through said opening, substantially as set forth.

22. The combination with the hopper having a passage way leading therefrom, of the rotating disk having the button receptacles therein, and a spring-lip, 36, to facilitate the passage of a button into the hopper which may fail of being properly delivered into the passage way, substantially as set forth.

23. The combination with the hopper having a rotatable side or bottom, and the button-holding and releasing grip, and its pinion, 15, of a coiled spring, 31, one end of which is secured to the shaft of said pinion and the other end to a fixed stud, 32, to take up or prevent lost motion in said grip, substantially as set forth.

24. The combination with the chuck, 16, the reciprocating carriage, and the stud or punch, 18, of the arm, 19, carrying said punch and pivotally secured to said carriage; a cam-arm 20, having a vertical motion and operating said arm 19, to press the punch 18 against the button and force it into said chuck; and means for imparting motion to said cam-arm, as described and for the purposes set forth.

25. The combination with the hopper and the rotating disk or bottom, having the button receptacles therein, and a support therefor, of a slide-plate, L, carried by said support, a cam-bar, L', carried by said plate; a hinged cut-off, m, operated in one direction by said cam-bar, and a spring, 11, by which it is operated in another direction; substantially as and for the purposes set forth.

26. The combination with the hopper and the rotatable disk carried thereby; of the grip for receiving the buttons therefrom; the chuck to which the buttons are delivered by said grip; the punch or stud, 18, and its carrier, 19, the cam-arm, 20, the plunger, 21, connecting with said cam-arm, the tripping block, 23, and means for operating said parts to hold the buttons to and release them from said chuck, as set forth.

27. The combination of a hopper having an inclined side or bottom adapted to rotate upon an inclined axis independent of the body or casing and provided with button receptacles; and means for communicating rotary motion to said side or bottom, as described and for the purposes set forth.

In testimony that I claim the foregoing I have hereunto set my hand this 20th day of April, 1894.

THOMAS F. MORRISSEY.

Witnesses:
OLIVER DRAKE,
ROBERT SOLLBERGER.